United States Patent [19]
Chin et al.

[11] Patent Number: 5,673,143
[45] Date of Patent: Sep. 30, 1997

[54] THERMAL IMAGING DEVICE WITH SELECTIVELY REPLACEABLE TELESCOPIC LENSES AND AUTOMATIC LENS IDENTIFICATION

[75] Inventors: Richard Chin; Gary Mladjan, both of Torrance; Stephen Shaffer, West Hills, all of Calif.; Conrad Stenton, Midland, Canada

[73] Assignee: Hughes Electronics, Los Angeles, Calif.

[21] Appl. No.: 540,733

[22] Filed: Oct. 11, 1995

[51] Int. Cl.$^6$ .......................... G02B 15/14; G02B 13/14; H04N 3/09

[52] U.S. Cl. .................. 359/354; 359/421; 359/827; 359/422; 359/903; 250/368

[58] Field of Search ...................... 359/353, 354, 359/400, 421, 827, 828, 821, 418, 903, 350, 355, 422; 250/368; 354/400, 195.1

[56] References Cited

U.S. PATENT DOCUMENTS

| | | | |
|---|---|---|---|
| 5,339 | 8/1847 | Yates | 359/827 |
| 3,737,667 | 6/1973 | Babb et al. | 359/418 |
| 4,278,334 | 7/1981 | Maeda | 353/85 |
| 4,391,488 | 7/1983 | Ishizaka et al. | 359/827 |
| 4,961,278 | 10/1990 | Johnson et al. | 359/353 |
| 5,365,057 | 11/1994 | Morley et al. | 359/400 |
| 5,369,460 | 11/1994 | Taniguchi et al. | 354/195.1 |
| 5,414,557 | 5/1995 | Phillips | 359/400 |
| 5,455,711 | 10/1995 | Palmer | 359/353 |

FOREIGN PATENT DOCUMENTS

| | | | |
|---|---|---|---|
| 31 151 A2 | 12/1979 | European Pat. Off. | 359/827 |
| 5-33416 | 12/1993 | Japan | 359/827 |

*Primary Examiner*—Jon W. Henry
*Attorney, Agent, or Firm*—Gordon R. Lindeen, III; Michael W. Sales; Wanda K. Denson-Low

[57] ABSTRACT

A thermal imaging device (10) provides for its use with a variety of accessory telescopic lenses (12). Each of the accessory telescopic lenses (12) and the thermal imaging device (10) include cooperating physical features allowing the lenses (12) to be mated with the device (10) in a single relative position. Each lens (12) also carries a uniquely positioned magnet (176), and the thermal imaging device (10) includes a plurality of magnetically-responsive sensors (178) responding to the magnets (176) of the various lenses (12) to identify which (if any) of the accessory lens (12) is installed on the device (10). Some of the accessory lenses (12) also include a variable-power feature. These variable-power lenses (12) have an additional magnet (182) moving between an effective position and an ineffective position in response to a user-selected power setting for the lens (12). The thermal imaging device (10) includes an additional magnetically-responsive sensor (178) affected by the additional magnet (182) in its effective position, but not effected in the ineffective position of this additional magnet (182). Thus, the thermal imaging device (10) also identifies the power setting of an installed variable-power lens (12). The thermal imaging device (10) is provided with internal adjustments and operational options which are automatically implemented dependent upon which of the accessory lenses (12) a user installs on the device (10).

12 Claims, 4 Drawing Sheets

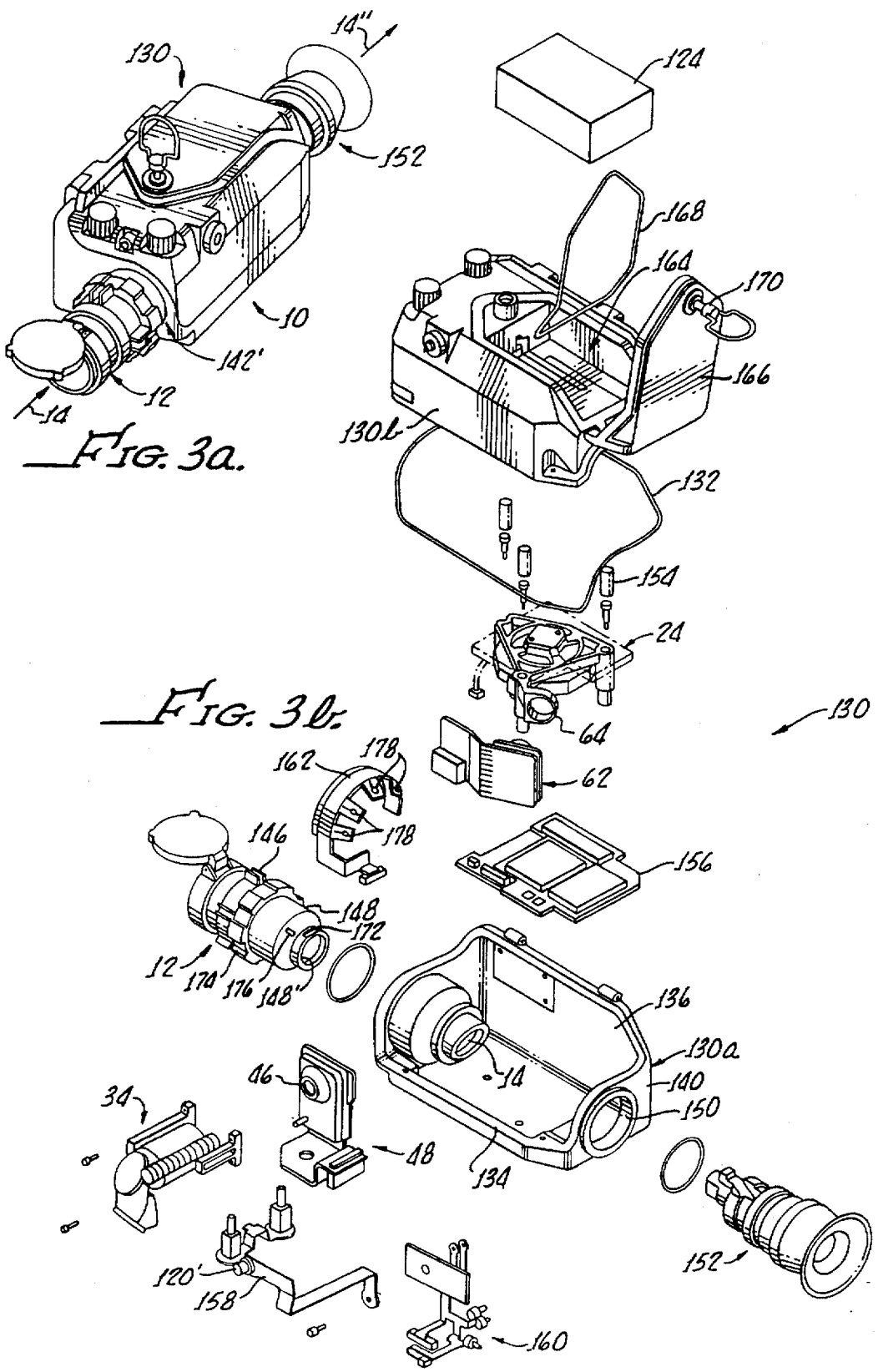

| | WIDE | TELE. | 176 | 176' | 176" | 182 |
|---|---|---|---|---|---|---|
| NO LENS | 1:1 | N/A | N/A | N/A | N/A | N/A |
| LENS #1 | 3.3:1 | | | | ✓ | |
| LENS #1 | | 10:1 | | | ✓ | ✓ |
| LENS #2 | 2:1 | | | ✓ | | |
| LENS #2 | | 3.3:1 | | ✓ | | ✓ |
| LENS #3 | 2.2:1 | | ✓ | | | N/A |
| LENS #3 | | N/A | ✓ | | | N/A |

THERMAL IMAGING DEVICE WITH SELECTIVELY REPLACEABLE TELESCOPIC LENSES AND AUTOMATIC LENS IDENTIFICATION

This invention was made with support from the United States Government under contract number DAAB07-91-C-K254 awarded by the Department of the Army. The U.S. Government has certain rights in this invention.

BACKGROUND OF THE INVENTION

1. Field of the Invention

The present invention is in the field of imaging devices. More particularly, the present invention relates to devices for receiving invisible infrared light from a scene, and for providing a visible-light image replicating the scene.

2. Related Technology

Night vision devices have been available for many years. One category of these conventional night vision devices uses image intensifier technology. This technology is effected using a device generally known as an image intensifier tube. The image intensifier tube is essentially a frequency-shifting and amplifying device receiving ambient light, which light may include visible light too dim to provide natural vision (i.e., so-called "Star Light" scopes), or invisible near-infrared light, in a first frequency band and responsively providing a greatly intensified visible image in a phosphorescent monochrome yellow-green light.

Such an image intensifier night vision device converts available low-intensity ambient light to a visible image which a human user of the device may use for surveillance or weapon aiming, for example, under lighting conditions of too dim to allow a scene to be viewed with the natural vision. These image intensifier night vision devices require some residual light, such as moon or star light, in which to operate. This light is generally rich in infrared radiation, which is invisible to the human eye. The present generation of night vision scopes use a photoelectrically responsive "window", referred to as a photocathode, which is responsive to the dim or invisible ambient light focused on this "window" from an invisible scene to provide a pattern of photo-electrons flowing as a space charge moving under the influence of an applied electrostatic field, and replicating the scene being viewed. This pattern of photo-electrons is provided to a microchannel plate, which amplifies the electron pattern to a much higher level. To accomplish this amplification at the microchannel plate, the pattern of photo-electrons is introduced into a multitude of small channels (or microchannels) which open onto the opposite surfaces of the plate. By the secondary emission of electrons from the interior surfaces of these channels a shower of electrons in a pattern corresponding to the low-level image is produced. The shower of electrons, at an intensity much above that produced by the photocathode, is then directed onto a phosphorescent screen, again by the application of an electrostatic field. The phosphors of the screen produce an image in visible light which replicates the low-level image.

Image intensifier tubes have evolved from the so-called "Generation I" tubes through the more recent "Generation III" tubes, which provide greater amplification of available light and greater sensitivity to infrared light somewhat deeper into the infrared portion of the spectrum. However, these image intensifier devices are limited with respect to the depth into the infrared portion of the spectrum to which they can operate.

Another category of conventional night vision device is represented by the cryogenically cooled focal plane array thermal imaging devices. These devices use a photoelectrically responsive detector which is cooled to a temperature in the cryogenic range to reduce unwanted thermal noise. The detector includes a plurality of detector elements, or "pixels", each of which provides an electrical signal indicative of the flux of infrared light falling on the detector element. Some such devices use a staring focal plane array; while others have a linear focal plane array of detector elements, and require the use of a scanner to sequentially move portions of the viewed scene across the detector. In either case, because the detector is cooled to cryogenic temperatures, it can proved an electrical response to invisible infrared light much deeper into the infrared part of the spectrum than is possible with the image intensifier devices. The electrical signal provided by such a detector must be processed and converted to a visible image. For this purpose, many such devices of this category have used cathode ray tubes, liquid crystal displays, and other such display technologies to provide a visible image to the user of the device.

A significant disadvantage of this category of night vision device is the requirement for cryogenic cooling of the detector. Early devices of this category used a Dewar vessel into which a supply of a cryogenic fluid (such a liquid nitrogen) had to be provided by the user of the device. The utility of such devices was severely limited by their requirement for occasional replenishment of the cryogenic coolant. Later devices of this type have used cryogenic cooling developed by reverse Sterling-cycle coolers. However, such coolers require a considerable amount of power, are not without their own maintenance and reliability problems, and are generally noisy.

Generally, some of the image intensifier type of night vision devices may be used with add-on telescopes and other types of accessory lenses (i.e., wide-angle lenses, etc.). These telescopic lenses have the effect of bringing far away scenes apparently closer to the user of the device. However, the imaging device itself does not adapt to the telescopic lens mounted to it. That is, if the night vision device is equipped with an aiming reticle, this reticle does not adapt to the enlarged image of the scene being viewed through the telescopic lens. Moreover, the angular size of the reticle cross hairs or other aiming indicia may be larger that desired when the image is enlarged by a telescopic lens. Similarly, if equipped with range estimation stadia lines in the field of view, the apparent spacing between these lines will not change when a telescope is used with the imaging device. Thus, the range estimation lines may not be useable with a telescopic lens mounted to the viewing device. Alternatively, a dual set of stadia lines may be provided, one for use without and one for use with the add-on telescopic lens. However, this extra set of stadia lines is always present in the field of view of the device, and can prove distracting or can obstruct part of the viewed scene.

A conventional thermal infrared imaging device (known under its military designation of AAWS-M) allowed for use of the device with a variety of telescopic and or wide-angle lenses. However, the user of the device had to manually provide control input commands allowing the device to alter its display parameters to accommodate the installed lens. This expedient is undesirable because of the time and complexity involved for the user of such a device.

SUMMARY OF THE INVENTION

In view of the deficiencies of the conventional technology, a primary object for this invention is to overcome one or more of these deficiencies.

Another object for this invention is to provide a thermal infrared imaging device having selectively replaceable telescopic or wide angle lenses, for example, and which automatically recognized which of the several lenses is installed, changing display parameters for the device accordingly.

Accordingly, the present invention provides a thermal imaging device having a housing, the thermal imaging device receiving thermal infrared radiation from a viewed scene and responsively providing a visible image replicating the viewed scene, the thermal imaging device including the housing defining an optical aperture at which thermal infrared light from a viewed scene is received, a lens assembly attachable to the housing at the optical aperture for receiving thermal infrared radiation from the viewed scene and providing the infrared radiation to the thermal imaging device, the lens assembly carrying a magnet uniquely positioned on the lens assembly, and the housing carrying a magnetically-responsive sensor responding to the magnet to identify the lens assembly.

These and additional objects and advantages of the present invention will be appreciated from a reading of the following detailed description of at least one preferred exemplary embodiment of the invention, taken in conjunction with the appended drawing Figures, in which the same reference numeral indicates the same feature, or features which are analogous in structure or function to one another.

DESCRIPTION OF THE DRAWING FIGURES

FIG. 1 provides a diagrammatic representation of the functionally cooperating physical components of a thermal imaging device embodying the invention;

FIG. 2 is a schematic block diagram of a thermal imaging device according to the present invention;

FIGS. 3a and 3b respectively provide an external view and an exploded perspective view of a thermal imaging device embodying the invention, which is shown with one of the accessory telescopic lenses which may be mounted to the device;

FIGS. 4a and 4b collectively show other accessory lenses which may be used with the present thermal imaging device; and FIG. 5 provides a tabulation of the telescopic magnification and field of view setting of the various accessory lenses usable with the present thermal imaging device, along with applicable magnetic position-code entries allowing the device to automatically identify each lens as well as the field of view setting of each particular lens, if applicable.

DETAILED DESCRIPTION OF AN EXEMPLARY PREFERRED EMBODIMENT OF THE INVENTION

An Overview

Figure 1:
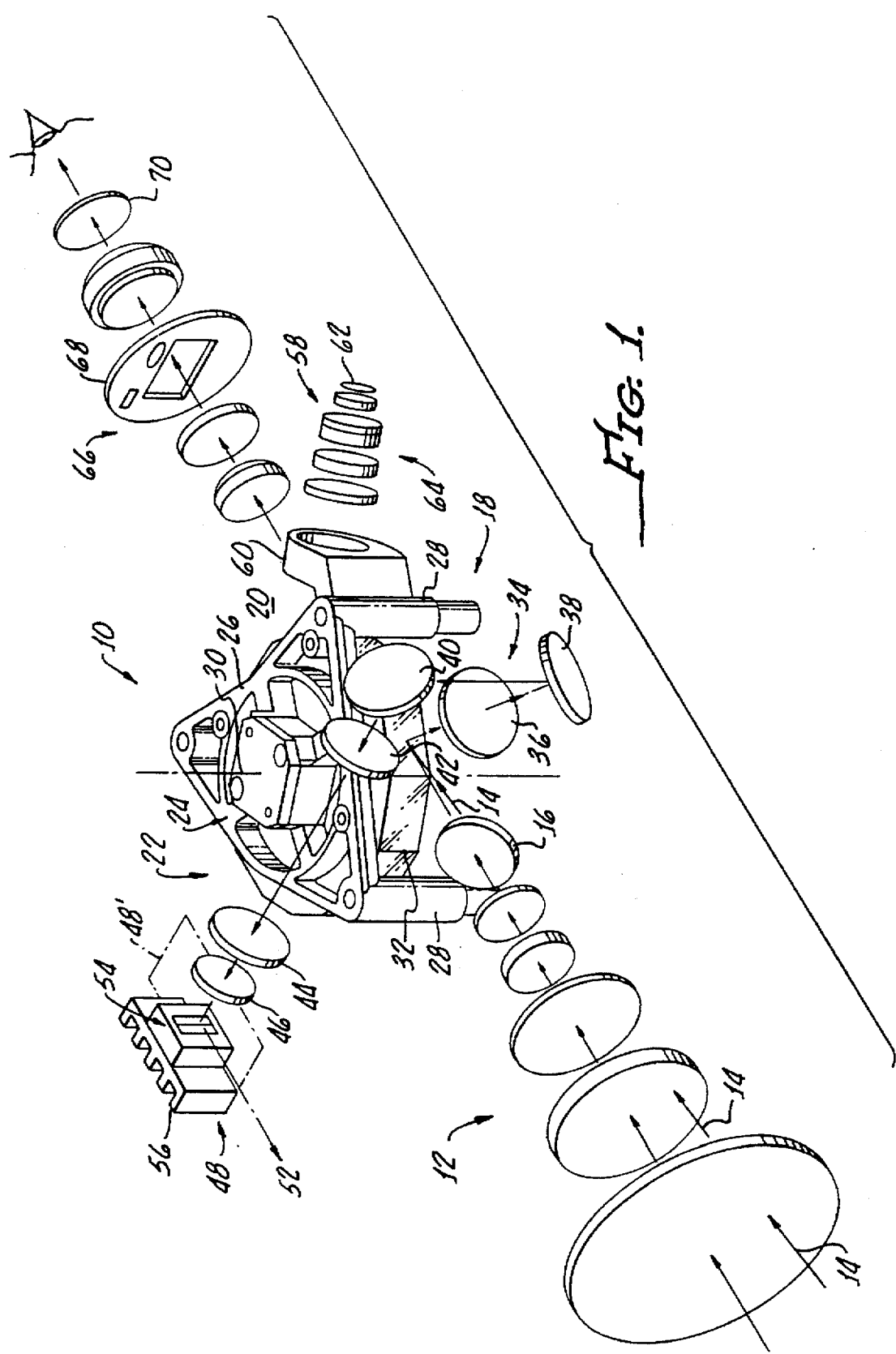

Viewing FIG. 1, a thermal imaging device 10 is diagrammatically depicted with its functionally cooperative physical components suspended in space without the depiction of a supporting housing (which housing is, of course, included by a physical embodiment of the device), so that these components and a ray-tracing diagram for light rays in the device can also be presented. Viewing FIG. 1 in detail, the thermal imaging device includes an objective optics group, generally indicated with the numeral 12. This objective optics group includes several lenses (indicated with reference numerals 12', 12", 12'", etc.), which lenses are transparent to light in the spectral band of interest (but not necessarily transparent to visible light). The objective optics group 12 is pointed toward a scene to be viewed, so that infrared light from this scene (indicated with the arrowed numeral 14) can be received and focused by this optics group. It will be understood that the objective optics group 12 seen in FIG. 1 is representative only, and that this optics group may be removed and replaced with objective optics of differing configurations, as will be further described. The objective optics group 12 concentrates and columnates received light through a window 16, which window is a permanent part of a basic sensor portion 18 of the device 10. In conjunction with the housing (to be described below) of this basic sensor portion 18, this window 16 bounds a sealed chamber 20 in which are received almost all of the remaining components of the device 10 as illustrated in FIG. 1.

Within the housing chamber 20 is received a scanner, generally referenced with the numeral 22. This scanner 22 includes a scanner frame 24, which is generally of triangular or tripod configuration in plan view. The scanner frame 24 includes a generally triangular upper wall portion 26, and three depending leg portions 28, only two of which are visible in FIG. 1. Carried by the wall portion 26 is a scanner motor, generally indicated with the numeral 30. This scanner motor 30 includes a generally vertically extending rotational drive shaft (not visible in the drawing Figures) drivingly carrying a disk-like circular multi-faceted scanning mirror 32. The scanning mirror 32 includes plural outwardly and circumferentially disposed adjacent facets or faces 32a, 32b, etc. only a few facets of which are seen in any one of the drawing Figures. This scanning mirror 32 rotates in a generally horizontal plane to reflect light 14 received via the window 16 and objective optics group 12 to an image optics group, generally indicated with the numeral 34. It will be noted that because of rotation of the scanning mirror 32, the facets 32a, 32b, etc., continually change their angulation in the horizontal plane with respect to the scene viewed via the objective optics group 12.

Considering the image optics group 34 in greater detail, it is seen that light (arrow 14) reflected from a facet of the scanning mirror 32 passes through a lens 36 and to a pair of vertically spaced angulated mirrors 38, and 40. The mirror 40 reflects this light through an additional pair of lenses 42, and 44 toward a window 46 carried by a Dewar vessel 48. The Dewar vessel 48 includes a thermally insulative housing, generally indicated with the dashed line and the reference numeral 48'. This Dewar vessel 48 houses a linear focal plane infrared detector 50 having a linearly arrayed multitude of small infrared detector elements, indicated collectively on FIG. 1 with the vertical line 50' on detector 50. Each of the detector elements 50' of the detector 50 provides a corresponding one of a like multitude of electrical signals each of which is indicative of the flux level of infrared light falling on the particular detector element. These electrical signals are provided outwardly of the Dewar vessel 48 by an electrical interface (to be further described), and indicated on FIG. 1 with the dashed line 52.

In order to cool the detector 50 to a sufficiently low temperature that thermally excited electrons (as opposed to electrons excited by photons of infrared light falling on the detector 50) do not cause an undesirably high level of electrical noise which would hide the desired photoelectric image signal, the Dewar vessel 48 includes a multi-stage reversed Peltier-effect (i.e., thermoelectric) cooler 54. The thermoelectric cooler 54 has a chilling face to which the detector 50 is mounted to be cooled, and a heating face in heat transfer relationship with a heat sink schematically indicated with the numeral 56. In the physical embodiment of the imaging device 10, the heat sink 56 is defined by a metallic portion of the housing for the device 10 as will be seen. It will be understood that because of the continuous change in angulation of each facet 32a, 32b, etc., of the scanning mirror 32 as this mirror rotates in a horizontal plane, the scene reflected from each particular facet sweeps horizontally across the linear array of detector elements 50' (i.e., perpendicularly to the vertical linear array of these detector elements). The detector elements 50' responsively provide electrical signals (via interface 52) which are indicative of the flux levels of infrared light falling on corresponding ones of the plural detector elements 50' from a particular part of the scene during any one sweep of a scene portion across the detector 50.

In order to provide a visible image to be viewed by a user of the imaging device 10, a light emitting diode (LED) projection array module 58 is carried by an apertured flange portion 60 of the scanner frame 26. This LED projection array module 58 includes a linear LED array 62, which array includes a multitude of individual LED's (not visible in FIG. 1, but indicated with the arrowed numeral 62'), each individually emitting visible light when energized. The LED's 62' of the array 62 are arrayed linearly along a vertical line similarly to the linear arrangement of the detector elements 50' of the detector 50. The LED's 62' provide respective portions of a visible image, as will become apparent. Light from the LED's 62' is columnated and projected by a projection lens group, generally indicated with the numeral 64, onto a facet of the mirror 32, and as indicated by the arrowed reference numerals 14'. The numerals 14 and 14' are used intentionally with respect to the invisible infrared light carrying image information from a scene, and the visible light replicating the scene for viewing by a user of the device 10.

From the mirror 32 (i.e., from a particular facet 32' of this mirror) the visible light from the LED's 62' is reflected to an ocular lens group, generally indicated with the numeral 66. The ocular lens group 66 includes several individual lenses, indicated with the respective reference numerals 66', 66", etc. Along with these lenses 66', 66", etc., a status display unit 68 is interposed in the ocular lens group 66. This status display unit 68 defines an aperture through which the visible image is perceived, and includes several individual LED's which when illuminating are peripherally visible to the user of the device 10. These individual LED's are indicated with the numerals 68', 68", etc. Finally, the imaging device 10 includes a pair of eyepiece shutters 70. These shutters 70 are biased closed to prevent light emanations from the device 10 when a user's face is not pressed against a movable eyepiece member (to be described below). When the user presses against the movable eyepiece member, the shutters 70 open to allow the user to view the visible light image provided by the LED projection display module and the spinning mirror 32.

Figure 2:
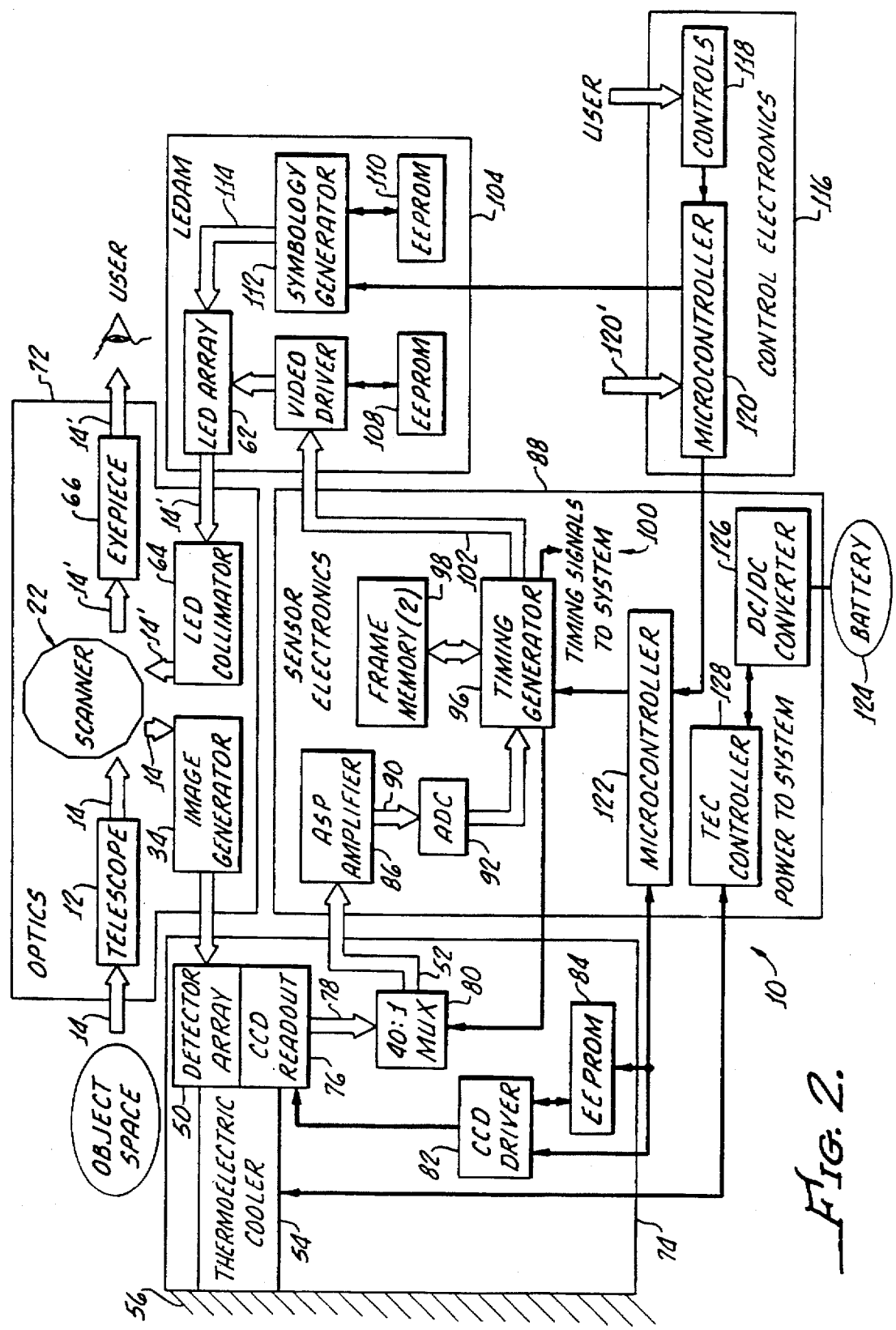

Viewing now FIG. 2, a schematic functional block diagram of the thermal imaging device 10 is presented. This thermal image device 10 is divided into functionally modular portions, as is indicated by the dashed-line boxes encircling the various components of the device, with some of the modules including several sub-modules or components. The module 72 manages both invisible and visible light, and includes the objective optics group 12 receiving the invisible infrared light 14 from a scene to be viewed, the scanner 22, and image optics group 34 directing this invisible light to the detector 50. This light management module 72 also receives visible light from the LED array 62, and includes the projection lens group 64 projecting this light to the scanner 22, and ocular lens group 66 providing the image to a user of the device.

Detection module 74 is enclosed within the Dewar vessel 48, and receives the focused invisible infrared light 14 from the scene to be viewed. This module 74 includes the detector 50, along with a readout circuit 76 providing multiple channels of electrical image signal 78 (one channel for each detector element of the linear detector array 50, recalling the description above) to a multiplexer circuit (MUX) 80. The MUX 80 provides the electrical interface output 52 in the form of a serial analog image signal. Detector module 74 also includes a driver circuit 82 providing control commands to the readout circuit 76. An electrically erasable programmable read-only memory (EEPROM) 84 is included in the detection module 74 to locally store and provide data on the operation of the readout circuit 76, providing compensation factors locally for a number of gain-control and non-uniformity compensations in connection with the infrared detector 50. As can be seen from FIG. 2, the various circuits of the module 74 have electrical interface with other modules of the device 10.

The serial analog image signals 52 provided by module 74 are received by an analog signal processor (ASP) 86 which is located in a process-and-control (P&C) module 88. A processed serial analog image signal 90 is provided by the ASP 86 to a analog-to-digital converter (ADC) 92. A resulting processed serial digital image signal 94 is provided to a timing generator 96. This timing generator 96 has an interface with the multiplexer circuit 80 to control the timing of operation of this circuit. A frame memory 98 is interfaced with the timing generator so that image information which is global to the scene being viewed may be stored and retrieved for use in providing gain adjustment, contrast, and other compensation factors for use in processing the image signals obtained from the detection module 74. Timing generator 96 also provides a system-wide timing control signal, indicated with the reference numeral 100. This timing control signal is used to operate several other features of the imaging device 10, including control of the rotational speed and position of the mirror 32 so as to achieve time-correlation of the operation of the detector 50, mirror 32, and LED array 62.

A serial digital image signal 102, compensated and time-correlated, is provided by the timing generator 96 to a display module 104. This display module 104 includes the LED projection array module 58, along with a driver circuit 106 for receiving the signal 102 and driving the individual LED's 62' in response to this signal. An electrically erasable programmable read-only memory (EEPROM) 108 has an interface with the driver circuit 106 for receiving and storing for future use values to be used in the operation of the device 10. For example, EPROM 108 may be used to store stadia line spacing information, which would allow the device 10 to be used to estimate ranges to personnel or vehicles of known sizes. In order to provide a user of the imaging device 10 with additional useful image information, such as spaced apart comparative-size lines for humans and various types of vehicles so that ranges can be estimated, or with a reticle of various kinds and sizes in accord with the range to an object being viewed and the use being made of the device 10 at a particular time, the display module 102 also includes another electrically erasable programmable read-only memory (EEPROM) 110 for storing such image information. This image information, as selected by the user of the device 10, is provided to a symbology generator circuit 112, which in turn provides a symbology signal 114 to the LED array 62. The array 62 includes separate light emitting diodes (LED's) for receiving the signal 114.

In order to complete this description of the imaging device 10 as illustrated in FIG. 2, it should be noted that the device 10 includes an input-output (I/O) module 116. This I/O module 116 allows a user of the device 10 to input commands via a set of externally-accessible controls 118, such as a set of momentary contact push button switches which may be operated from outside the housing of the device 10. The controls 118 have an interface with a microprocessor 118, which is part of a distributed control system also including another microprocessor 122 in the P&C module 88. The microprocessors 120 and 122 have an interface with the EEPROM's 84, 108 and 110, along with the circuits served by the data and commands stored in these EEPROM's. The microprocessor 120 has an externally-accessible data interface port 120' so that all of the data and programming stored in the microprocessors 120, 122, and the EEPROM's interfaced with these microprocessors, and the circuits served, may be inserted and changed by access to the port 120'. Finally, it is seen that the P&C module 88 provides power input to the system from a power source, such as from a battery pack 124. A DC/DC power converter 126 provides power to various modules and components of the device 10 at appropriate voltage and current levels. One of the circuits powered from converter 126 is a controller 128 for the thermoelectric cooler 54.

Turning now to FIGS. 3a and 3b, a physical embodiment of the imaging device 10 is presented in external view and in exploded perspective view, respectively. The imaging device 10 includes a two-piece chambered housing 130. This housing includes two pieces 130a and 130b which sealingly cooperate (via an intervening sealing member 132) to bound the chamber 20 within this housing. The part 130a of the housing 130 is fabricated of cast non-magnetic metal (of aluminum, for example), is somewhat L-shaped in transverse cross section, and provides a lower wall portion 134, a side wall portion 136, and an apertured pair of opposite front (138), and rear (140) wall portions. This housing part 130a provides a heat sink for the thermoelectric cooler 54, and a base (i.e., in effect, an optical bench) to which the optical and other components of the device 10 are mounted, as will be seen.

The front wall portion 138 of housing part 130a defines a reentrant portion 142 which forwardly defines a somewhat conical recess (not visible in the drawing Figures, but referenced on FIG. 3a with the arrowed numeral 142'), and which at its aft end carries the window 16 in the aperture 144 of this wall. The objective optics group 12 is carried at this front wall 138 by a lens housing 146 which at its aft end defines a conical portion 148 for receipt into the front recess of the housing part 130a. The conical portion 148 centrally defines an aperture 148' within which the most rearward of the lens elements 12', 12", etc., is received, and defines an optical aperture (also referenced 148') at which thermal infrared radiation received by the objective lens 12' is delivered to the device 10. The housing 146 is removably engageable with the housing part 130 to connect the objective optics group 12 in its proper location, and is also removable so that optics of different power may be fitted to the sensor portion 18. At the aperture 150 of the rear wall portion 140, the ocular lens group 66 is sealingly carried in a housing portion 152.

Within the chamber 20 of the housing 130, the scanner 24 is secured to the lower wall 134 by a trio of screws 154 which each pass through a respective vertically extending hole defined centrally of a corresponding one of the three legs 28 of the scanner frame 24. These screws threadably engage respective bores defined by the lower wall 134. Captured between the lower ends of the legs of the scanner frame 24 and the lower wall 134 of the housing 130 is an electronics assembly 156. This electronics assembly 156 includes a circuit board and many of the discreet and integrated circuit devices including micro-controller 122, which are necessary in order to effect the functions explained with respect to FIGS. 1 and 2. Also mounted to the lower housing part 130a, in addition to the already identified components and modules, which are indicated on FIG. 3b with their previously-introduced reference numerals, is an electronic cable assembly 158. This cable carries externally-accessible data interface port 120', the connector for which extends sealingly through a hole provided in the housing portion 130b, as is seen in this drawing Figure.

A Control electronics module 160 with its own cable assembly also mounts in the housing 130 and provides the control input momentary-contact switches 118 and micro-controller 120 identified with respect to FIG. 2. Finally, received in the housing 130 and circumscribing the reentrant portion 142 of the front wall 138 is a magnetic reed switch and cable assembly 162. This cable assembly with its several magnetically-responsive reed switches is responsive to one or more magnets carried in respective locations by various ones of the objective optics groups which can be used with the basic sensor 18. These magnets are located in particular locations (i.e., in a position code) on each objective lens set in order to provide a user both with differing levels of magnification of a distant scene, and differing symbology appropriate for the particular use for which the objective lens set adapts the sensor 18. When the basic sensor responds to the installation of a particular lens group, the user is provided with symbology and other internal adjustments of the operation of the sensor 18 automatically. The reed switches are able to sense the particular locations of the magnets on the lens groups (thus identifying the particular lens group) through the non-magnetic front wall portion 138 of the housing 130. Thus, no physical input is necessary from an operator to identify a particular lens group to the sensor 18, and the chamber 20 remains sealed.

Viewing now the housing portion 130b, it is seen that this housing portion defines a battery compartment recess 164 at an aft portion of the housing 130. This recess opens both upwardly and rearwardly on the housing part 130b. Battery 124 is received into the recess 164, and is covered sealingly in this recess by a hinged door member 166 with an intervening sealing member 168. The door 166 is somewhat L-shaped in side view, and is hinged adjacent to its rear edge to the housing part 130b. A latching device 170 is carried by the door 166 adjacent to its forward end, and is removably engageable with a recess feature of this housing part to retain the door 166 in its closed position, as is seen in FIG. 3a.

Identification of Accessory Lenses

Still viewing FIG. 3b it will be appreciated that if the thermal imaging device 10 is used without the objective optics group 12, then the image optics group 34 internal to the housing 130 will focus an image on the detector 50. In this configuration, the thermal imaging device 10 has the widest possible field of view (FOV), and has a unity power. That is, the image presented to the user of the device 10 is the same size as would be seen through a unity power telescope, except that the presented image is a replication in visible light of the invisible thermal infrared light from the viewed scene. If the user chooses to employ a telescopic objective lens group 12 with the device 10, the housing 146 for this telescopic lens group is inserted at its conical rear portion 148 into the matching cavity at the from of the housing 130, as was explained above. FIG. 3 shows that the conical rear portion 148 of the housing 146 carries a flat feature 172 defined on the conical portion so that the housing can be fully seated into the device 10 in only one relative rotational position. An internally threaded retaining ring 174 rotationally carried by the housing 146 threadably engages a threaded annular boss (not visible in the drawing Figures) on the front of housing 130 to releasably retain the telescopic lens.

The telescopic accessory lens seen in FIG. 3 is one of three alternative telescopic lenses which may be used with the device 10. The other two alternative telescopic lenses are seen as a group in FIG. 4. Viewing FIG. 3, it is seen that this accessory lens has on the housing 146 a magnet carried on the housing portion 148 in a location indicated with the numbered arrow 176. This magnet is uniquely positioned relative to the feature 172. The magnet 176 of this lens aligns with and actuates only one of the magnetic reed switches 178 carried on reed switch assembly 162. The one of the reed switches 178 actuated by the magnet 176 uniquely identifies the installed telescopic lens. Each of the other two lenses seen in FIGS. 4 likewise has a magnet (176', 176") differently positioned relative to the flat feature 172 of that lens so as to actuate only a corresponding one of the four reed switches of the reed switch assembly 176.

Turning now to FIGS. 4, it is seen more particularly that each of the other two accessory telescopic lenses also has a similar magnet (176', and 176") uniquely located on the respective portion 148 of the lens. The two of these three lenses seen in FIGS. 4 also include a two-position variable-power (and variable field of view) feature. It will be understood that greater magnification (greater power) results in the user of the device 10 being provided with a narrower field of view. Conversely, if the user desires a wider field of view, a lower power setting for the lens will be used. This variable power feature is actuated by the user manually rotating a power-select ring 180 between either one of two possible rotational positions for this ring. In one of the two positions for ring 180, an additional internal magnet (not directly seen on the drawing Figures, but indicated by reference to its magnetic field area, as explained below) is spaced from the conical portion 148, and does not outwardly present a significant magnetic field. In the other position for the power-select ring 180, the additional internal magnet moves axially to a position adjacent to an inner surface of the portion 148. In this position, the magnet presents an additional area of magnetic field area on the portion 148 of the lens housing 146, which magnet, magnet position, and magnetic field area on the exterior surface 148 are all indicated on FIGS. 4 with the dashed line area and arrowed numeral 182. The magnetic field area 182 aligns with the forth magnetic reed switch 178 of the device 10. Thus, the device 10 can identify not only which one (if any) of the lenses 12 is installed by a user of the device, but also identifies which power setting is enabled by the user for those lenses have a variable power level.

Figures 4A, 4B, 5:
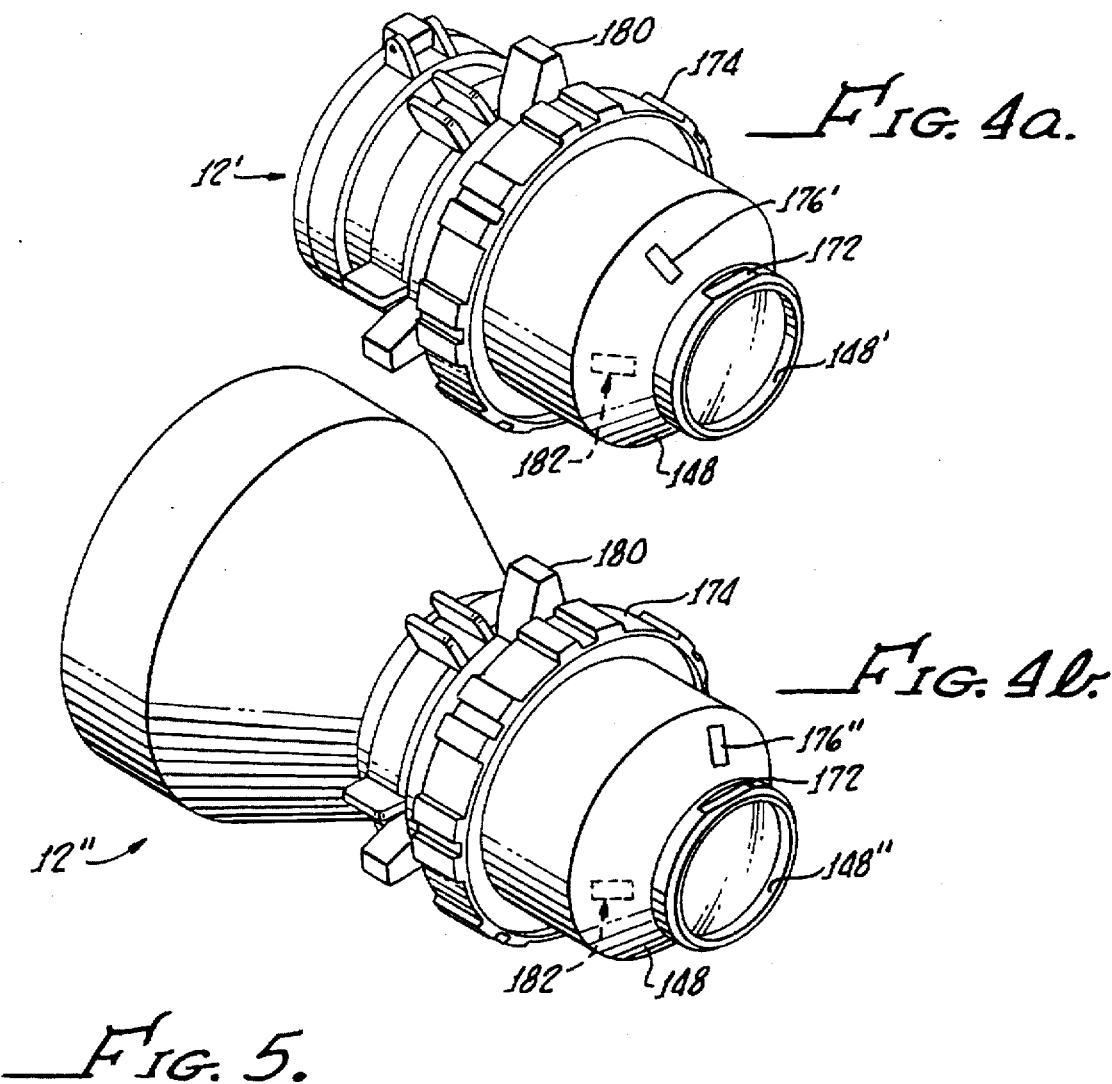

Table 5 provides a depiction of the locations of the magnets 176, 176', 176" on the various lenses 12, and the presence or absence of magnetic field at area 182 on the conical portion 148 of the lenses and the telescopic power level provided by these lenses to the user of the device 10, dependent upon the rotational position of the ring 180. The first row of this tabulation is for the device 10 alone with no installed accessory lens. It is seen from this tabulation that the three lenses use only a single-position magnetic code to indicate the installed lens. Thus, it is apparent that additional lenses can be provided for use with the device 10 without necessitating any internal structural changes to the device. The addition of lenses using a two-position magnetic would allow three additional lenses to be uniquely identified. An additional lens (for a total of seven accessory lenses) can be identified by using a magnetic field at all three of the magnetic reed switch positions used for lens identification. The device 10 can be programmed as necessary to recognize the installed accessory lenses, and to provide symbology to the user of the device as appropriate to the installed lens. The table of FIG. 5 also shows whether a magnetic field is present or absent at area 182 dependent upon the power level (and field of view) selected by the user of the device 10. From an inspection of FIG. 5, it will be apparent that lenses #1 and #2 are depicted in FIGS. 4, while the lens seen in FIGS. 3 is lens #3 and does not have a variable power or power select ring 180.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A thermal imaging device comprising:

a device housing sealingly defining a chamber therein, said device housing having at least a portion which is magnetically-permeable to allow penetration of an external magnetic field into said chamber; and said device housing defining an optical aperture allowing admission of infrared thermal radiation into said chamber, said optical aperture being sealingly closed by a window member which is transparent to thermal radiation;

a lens assembly having an optical axis, and a respective lens housing removably attachable to said device housing at said optical aperture to align said optical axis with said optical aperture, thus to direct infrared thermal radiation from a viewed scene into said chamber via said optical aperture, said lens assembly including a movable power-adjustment portion movement of which changes a power of telescopic magnification for said lens assembly;

a magnet fixedly positioned on said lens housing, when said lens housing is attached to said device housing said magnet being in juxtaposition to said magnetically-permeable portion of said device housing;

a second magnet moving between a first position and a second position dependent upon position of said power-adjustment portion, said second magnet in only one of said first and second positions providing a magnetic field which penetrates into said chamber via said magnetically-permeable portion of said device housing;

a magnetically-responsive sensor disposed within said chamber in juxtaposition to said magnetically permeable portion of said device housing;

whereby said magnetically-responsive sensor indicates the presence of said lens assembly at said optical aperture; and another magnetically-responsive sensor responding to said magnetic field of said second magnet in said one of said first and second positions to uniquely identify the power setting of said lens assembly.

2. The thermal imaging device of claim 1 wherein said device further includes another lens assembly, said another lens assembly being attachable to said housing in substitution for said lens assembly, said another lens assembly also carrying a magnet which is uniquely positioned on said another lens assembly, said housing carrying a second magnetically-responsive sensor responding to said magnet of said another lens assembly to identify said another lens assembly.

3. The thermal imaging device of claim 2 wherein said another lens assembly includes a movable variably-positioned power-adjustment portion the position of which changes a power of telescopic magnification for said another lens assembly, said another lens assembly also including a second magnet moving between a first position and a second position dependent upon a position of said power-setting portion, said second magnet in only one of said first and second positions providing a magnetic field which affects said thermal imaging device, said second magnetically-responsive sensor responding to said magnetic field in said one of said first and second positions of said another lens assembly second magnet to uniquely identify the power setting of said another lens assembly.

4. The thermal imaging device of claim 1 wherein said lens assembly includes a respective lens housing, said lens housing at a forward end thereof carrying an objective lens for receiving the thermal infrared radiation for the viewed scene, said lens housing including an aft portion defining a lens exit aperture at which the thermal infrared radiation is provided to the optical aperture of said thermal imaging device, said lens housing including a feature allowing attachment of said lens assembly to said housing of said thermal imaging device in one relative position which places said magnet in confrontation with said magnetically-responsive sensor.

5. The thermal imaging device of claim 4 wherein said lens housing at said aft portion thereof defines a truncated conical portion including said lens exit aperture, said lens housing including a flat on said conical portion allowing attachment of said lens assembly to said housing of said thermal imaging device in only one relative position.

6. The thermal imaging device of claim 5 wherein said magnet is selectively positioned relative to said flat on said conical portion of said lens housing.

7. The thermal imaging device of claim 1 wherein said housing of said thermal imaging device includes a forwardly-disposed recess receiving a portion of said lens assembly, said housing of said thermal imaging device internally defining a reentrant portion surrounding a portion of said lens assembly and defining said optical aperture, said thermal imaging device carrying a plurality of magnetically-responsive sensors surrounding said reentrant portion and magnetically responding to said magnet of said lens assembly.

8. The thermal imaging device of claim 7 wherein said plurality of magnetically-responsive sensors includes a magnetically-responsive reed switch.

9. The thermal imaging device of claim 8 wherein said plurality of magnetically-responsive sensors is carried by a flexible magnetic reed switch and cable assembly at least partially circumscribing said reentrant portion of said housing of said thermal imaging device.

10. The thermal imaging device of claim 1 wherein said lens housing at a forward end thereof carries an objective lens for receiving the thermal infrared radiation for the viewed scene and at an aft portion defines a surface portion including a lens exit aperture from which infrared thermal radiation may pass to said optical aperture, said lens housing including a structural means at said surface portion for allowing attachment of said lens housing of said device housing in only one relative rotational position about said optical axis.

11. The thermal imaging device of claim 10 wherein said structural means includes said surface portion defining a truncated conical shape of circular cross section, and a flat on said truncated conical shape, said device housing defining a recess of conical shape configured to receive said surface portion of said lens housing, and said recess having a flat disposed to be engaged by said flat of said lens housing.

12. The thermal imaging device of claim 1 wherein said magnetically-responsive sensor includes a magnetically-responsive reed switch.

* * * * *